United States Patent [19]

Geibel et al.

[11] Patent Number: 5,239,051

[45] Date of Patent: Aug. 24, 1993

[54] LIMITING THE AMOUNT OF WATER DURING THE PREPARATION OF PHENYLENE SULFIDE POLYMERS

[75] Inventors: Jon F. Geibel, Bartlesville; John E. Inda, Dewey, both of Okla.

[73] Assignee: Phillips Petroleum Company, Bartlesville, Okla.

[21] Appl. No.: 773,377

[22] Filed: Oct. 7, 1991

[51] Int. Cl.⁵ .............................................. C08G 75/16
[52] U.S. Cl. .................................. 528/388; 528/373; 528/387; 528/390
[58] Field of Search ................ 528/388, 373, 387, 390

[56] References Cited

U.S. PATENT DOCUMENTS

| | | | |
|---|---|---|---|
| 3,354,129 | 11/1967 | Edmonds, Jr. et al. | 260/79 |
| 3,800,845 | 4/1974 | Scoggin | 159/47 |
| 3,919,177 | 11/1975 | Campbell | 260/79.1 |
| 4,064,114 | 12/1977 | Edmonds, Jr. | 260/79.1 |
| 4,116,947 | 9/1978 | Edmonds, Jr. et al. | 528/388 |
| 4,500,702 | 2/1985 | Ostlinning et al. | 528/388 |
| 4,537,953 | 8/1985 | Kawakami et al. | 528/388 |
| 4,767,841 | 8/1988 | Goetz et al. | 528/388 |
| 4,820,800 | 4/1989 | Geibel | 528/388 |
| 4,910,294 | 3/1990 | Ogata et al. | 528/388 |

FOREIGN PATENT DOCUMENTS

| | | |
|---|---|---|
| 100536 | 2/1984 | European Pat. Off. |
| 280271 | 8/1988 | European Pat. Off. |
| 0323723 | 7/1989 | European Pat. Off. |
| 353716 | 2/1990 | European Pat. Off. |
| 1-32851 | 7/1989 | Japan |
| 2134124A | 8/1984 | United Kingdom |

*Primary Examiner*—Harold D. Anderson
*Attorney, Agent, or Firm*—Beverly M. Dollar

[57] ABSTRACT

A method is provided for increasing reactant concentrations for the polymerization of PPS without creating a deterioration of the molecular weight of the resultant polymer by limiting the amount of by-product water present during the initial portion of the polymerization reaction.

9 Claims, No Drawings

LIMITING THE AMOUNT OF WATER DURING THE PREPARATION OF PHENYLENE SULFIDE POLYMERS

FIELD OF THE INVENTION

The present invention relates to a poly(phenylene sulfide) (hereinafter "PPS") polymerization process.

BACKGROUND OF THE INVENTION

Processes for maximizing the amount of PPS produced from a given reactor are desired for purposes of gaining economic efficiency. Increasing the concentration of reactants per reactor volume offers a seemingly evident approach to maximizing PPS production. However, after the concentration of reactants employed exceeds about 0.36 moles of sulfur source per mole of polar organic compound, the molecular weight of the PPS resin significantly decreases.

The molecular weight of a PPS resin is generally related to the melt flow rate of the resin. Extrusion rate is a specific type of melt flow rate particularly useful for characterizing phenylene sulfide polymers in the lower molecular weight range, such as those produced in the manner disclosed in U.S. Pat. No. 3,354,129, (Nov. 21, 1967). The term extrusion rate, as used herein, refers to a flow rate measurement on molten polymer based on ASTM D1238, Procedure B-Automatically Time Flow Rate Measurement, Condition 316/0.345, using a 5 minute preheat time and an orifice having the dimensions of 0.0825±0.002 inch diameter and 1.25±0.002 inch length. A low value extrusion rate indicates a higher molecular weight resin, while a high value extrusion rate indicates a lower molecular weight resin.

Maintaining a sufficiently high molecular weight PPS resin is important for many of the commercial applications of the resin such as injection molding and the like. The deterioration of molecular weight associated with using reactant concentrations greater than about 0.36 moles of sulfur source per mole of polar organic compound is of a significant enough degree to change the characteristics of the resultant polymer. Therefore, increasing reactant concentrations beyond 0.36 moles of sulfur source per mole of polar organic compound has not been a method utilized for purposes of maximizing PPS production.

SUMMARY OF THE INVENTION

It is therefore an object of the present invention to allow increased concentrations of reactants to be used in a phenylene sulfide polymerization process for purposes of maximizing PPS production.

It is a further object of this invention to provide a method for producing phenylene sulfide polymers more economically.

It is still a further object of the present invention to increase the amount of polymer produced per reactor volume without creating a deterioration of the molecular weight of the resultant polymer.

Accordingly, this invention is premised upon the discovery that increasing the concentration of reactants also increases the concentration of by-product water produced during the PPS polymerization. It is this increased concentration of water present during the initial portion of the polymerization that has been been found to be detrimental to the molecular weight of the PPS resin. According to this invention, it has been discovered that by limiting the amount of reaction participating polar organic compound present during a step in which excess water is removed prior to polymerization, the result is a decrease in the amount of by-product water produced during polymerization, thereby allowing the use of high reactant concentrations during polymerization without a decrease in the product polymer's molecular weight.

In accordance with this invention, phenylene sulfide polymers are prepared by a process comprising the sequential steps of (a) dehydrating an aqueous admixture comprising at least one sulfur source and at least one polar organic compound under conditions of time and temperature sufficient to remove essentially all free water to form a dehydrated admixture, wherein the molar ratio of polar organic compound to sulfur source is in the range of 0.15/1 to 0.9/1; (b) admixing at least one polyhalo-substituted aromatic compound and optionally at least one dry inert diluent with the dehydrated admixture to form a polymerization mixture; (c) subjecting said polymerization mixture to polymerization conditions effective to produce a phenylene sulfide polymer.

DETAILED DESCRIPTION OF THE INVENTION

According to this invention, the production of poly(phenylene sulfide) resin in a readily controllable manner is improved by limiting the amount of polar organic compound relative to the sulfur source present during the dehydration step preceding polymerization. The PPS polymerization reaction mixture is comprised of at least one sulfur source, at least one polar organic compound, and at least one polyhalo-substituted aromatic compound. The increase in reactant concentrations is best expressed in a molar ratio of sulfur source to polar organic compound where at least 0.36 moles of sulfur source per mole of polar organic compound is present in the polymerization mixture. It is at this increased concentration that the molecular weight of the polymer begins to deteriorate due to the production of excessive by-product water. When the amount of polar organic compound is equal to or exceeds the amount of sulfur source during the dehydration step, one mole of by-product water is produced per one mole of sulfur source reacted. Accordingly, for this invention system, when less than 1 mole polar organic compound per mole sulfur source is present during the dehydration step, the amount of by-product water produced during the polymerization is reduced such that the amount of water produced does not cause deterioration of the molecular weight of the product.

According to this invention, compounds suitable for use as the sulfur source in the polymerization reaction mixture include alkali metal sulfides, alkali metal hydrosulfides, N-methyl-2-pyrrolidinethione, hydrogen sulfide, and mixtures thereof. The suitable alkali metal sulfides include lithium sulfide, sodium sulfide, potassium sulfide, rubidium sulfide, and cesium sulfide. The suitable alkali metal hydrosulfides include lithium hydrosulfide, sodium hydrosulfide, potassium hydrosulfide, rubidium hydrosulfide, and cesium hydrosulfide. Sodium sulfide and sodium hydrosulfide are presently preferred as suitable sulfur sources. It is often convenient to employ these sulfur source compounds as aqueous solutions or dispersions in the process of the invention. When sodium hydrosulfide is used as a sulfur source, optionally sodium hydroxide may be employed.

Other suitable sulfur sources are disclosed in U.S. Pat. No. 3,919,177, Nov. 11, 1975), issued to Phillips Petroleum Company, the disclosure of which is hereby incorporated by reference.

The polar organic compounds which can be employed in the polymerization reaction mixture include organic amides, lactams, ureas, sulfones, and mixtures thereof. Examples of suitable polar organic compounds include but are not limited to N-methyl-2-pyrrolidone, N-methylcaprolactam, N,N-ethylene dipyrrolidone, pyrrolidone, caprolactam, N-ethylcaprolactam, tetramethylene sulfone, N-ethyl-2-pyrrolidone and mixtures thereof. For reasons of availability, stability and generally good results N-methyl-2-pyrrolidone is a preferred polar organic compound for use according to the invention. As used herein, the polar organic compound is meant to denote those compounds which participate in the polymerization reaction. In addition, the polar organic compound can act as a reaction medium or as a carrier for the introduction of other reactants to the polymerization mixture. It is within the scope of this invention to employ other organic compounds as reaction media or carriers as well; however, such compounds should not be taken into account when computing the concentration of polar organic compound in the dehydration or polymerization and should be dry, essentially free of water, when added to the polymerization. Examples of suitable organic compounds which can be used as reaction media or carriers include those polar organic compounds previously listed, and in addition, include 1,3-dimethyl-2-imidazolidinone, 1-methyl-4-isopropyl-2-piperazinone, 1,3-dimethyl-2-piperazinone, and mixtures thereof.

According to this invention, the sulfur source is present in the polymerization mixture in an amount of at least about 0.36 moles of sulfur source per mole of polar organic compound. More preferably the sulfur source is present within a range from about 0.36 to about 0.6 moles of sulfur source per mole of polar organic compound, most preferably from 0.36 to 0.55 moles of sulfur source per mole of polar organic compound.

In accordance with this invention, the polar organic compound during the dehydration step is present in an amount in the range of about 0.15 to about 0.9 moles per mole of sulfur source, preferably about 0.2 to about 0.6 moles per mole of sulfur source.

The polyhalo-substituted aromatic compounds that can be employed in the polymerization are compounds wherein the halogen atoms are attached to aromatic ring carbon atoms. Preferably, the halo-substituted aromatic compounds are p-dihalo-substituted aromatic compounds, and more preferably are selected from the group consisting of p-dihalobenzenes having the formula

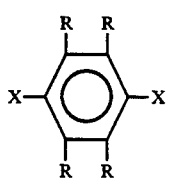

m-dihalobenzenes having the formula

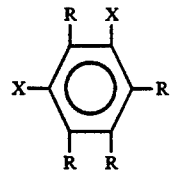

and o-dihalobenzenes having the formula

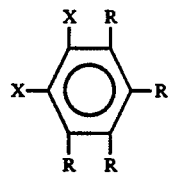

wherein X is a halogen selected from the group consisting of chlorine, bromine, and iodine, and R is hydrogen or an alkyl radical of 1-4 carbon atoms. Mixtures of suitable polyhalo-substituted aromatic compounds can also be employed according to the invention. For reasons of availability and generally good results, it is more preferred that dichlorobenzenes be employed with p-dichlorobenzene, thus giving poly(p-phenylene sulfide) polymers.

Further, though presently less preferred, polyhalo-substituted aromatic compounds having more than two halogen substituents per molecule can also be employed. These compounds are represented by the formula $R''(X)n$ wherein X is as previously defined, $R''$ is a polyvalent aromatic radical of 6 to about 16 carbon atoms and n is an integer of 3-6. Generally, the polyhalo-substituted aromatic compounds represented by the formula $R''(X)$, when employed, are optional components utilized in small amounts in admixture with suitable dihalo-substituted aromatic compounds.

Examples of some suitable polyhalo-substituted aromatic compounds include, 1,4-dichlorobenzene, 1,3-dichlorobenzene, 1,2-dichlorobenzene, 1,4-dibromobenzene, 1,4-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,3-trichlorobenzene, 1,2,4-trichlorobenzene, 1,3-dichloro-5-bromobenzene, 2,4,6-trichlorotoluene, hexachlorobenzene, 2,2'4,4'-tetrachlorobiphenyl, 2,2',6,6'-tetrabromobiphenyl, 4,4'-dichlorobiphenyl, and the like.

Although the amount of polyhalo-substituted aromatic compound present in the polymerization mixture can vary over a wide range, preferably the polyhalo-substituted aromatic compound is present within a range from about 0.90 to about 1.10 moles of polyhalo-substituted aromatic compound per mole of sulfur source, more preferably from 0.95 to 1.05 moles of polyhalo-substituted aromatic compound per mole of sulfur source, and most preferably from 0.98 to 1.04 moles of polyhalo-substituted aromatic compound per mole of sulfur source.

When polyhalo-substituted aromatic components having more than two halo constituents are used as comonomers, they are used in amounts within the range of from about 0.01 to about 1 mole percent, preferably from 0.05 to 0.8 mole percent, and more preferably 0.1 to 0.3 mole percent based on the total moles of polyhalo-substituted aromatic compounds.

The introduction of the polyhalo-substituted aromatic compound occurs after the sulfur source and polar organic compound have been combined, heated, and substantially dehydrated. The dehydration of the sulfur source and polar organic compound admixture occurs prior to the introduction of the polyhalo-substituted aromatic compound because the sulfur source component or components are generally found as aqueous solutions or dispersions, and the water must substantially be removed before polymerization begins. The dehydration step takes place under conditions of time and temperature such that essentially all of the free water is removed. Free water is meant to denote all water available for distillation and is meant to include the water produced by the dehydration of salts. Typically, the dehydration is conducted at a temperature in the range of 100° to 250° C. for a time period in the range of 10 minutes to 6 hours.

Upon introduction of the polyhalo-substituted aromatic compound, the polymerization mixture is subjected to polymerization conditions sufficient to produce PPS polymers, as known to those skilled in the art. Such conditions, for example, are disclosed in U.S. Pat. No. 3,354,129, Nov. 21, 1967), the disclosure of which is hereby incorporated by reference.

Although the reaction temperature at which the polymerization is conducted can vary over a wide range, generally it will be from about 125° C. to about 375° C., preferably about 175° C. to about 350° C. The reaction time can vary widely, depending in part on the reaction temperature, but generally will be about six minutes to about 72 hours, preferably about one hour to about eight hours. The pressure should be sufficient to maintain the organic components of the reaction mixture substantially in the liquid phase.

The phenylene sulfide polymers produced by the process of the invention can be separated from the reaction mixture by conventional procedures, e.g., by filtration of the cooled and solidified polymer, followed by washing with water or by dilution of the reaction mixture with water or polar organic compound or mixtures of water and polar organic compound, followed by filtration and water washing of the polymer.

The phenylene sulfide polymer produced by the process of the invention can be blended with fillers, pigments, extenders, other polymers, and the like. The polymer can be cured by heating at temperatures up to about 480° C. in the presence of a free oxygen-containing gas, to provide cured products having improved properties and high thermal stability and good chemical resistance. It is useful in the production of coatings and molded objects.

EXAMPLES

In the following examples, the polymer extrusion rates were determined by the method of ASTM D 1238, Condition 316/0.345, modified to use a five minute preheat, time with an orifice with a 2.096+/−0.005 mm diameter and a 31.75+/−0.05 mm length. The units of extrusion rate are grams per ten minutes (g/10 min).

EXAMPLE I

The PPS polymerization runs in this example are comparative runs that show the effect of N-methyl-2-pyrrolidone (NMP)-deficient dehydrations using moderate dehydration conditions. Run 1 is a control polymerization using more typical NMP levels in both the dehydration and polymerization steps. Runs 2-5 use reduced NMP levels in the dehydration step. All five runs in this example employed essentially the same total level of NMP (as measured by the sulfur compound to NMP mole ratio) in the polymerization step.

In Run 1, a one-liter reactor was charged with 1.0 g-mol sodium hydrosulfide (NaSH) as an aqueous mixture containing 59 weight percent NaSH, 1.0 g-mol sodium hydroxide (NaOH), and 2.0 g-mol NMP. After the reactor had been purged with nitrogen, the reactor stirrer was started and the reactor contents were heated for dehydration. From the first drop of liquid condensate at 157° C., dehydration was carried out for 31 minutes to a maximum temperature of 202° C. to collect 45 mL of liquid. From a gas phase chromatography (GC) analysis of the dehydration liquid condensate and the amount of water charged to the reactor, it was determined that 1.39 g-mol of water was not removed from the reactor during the dehydration.

Following the dehydration step, 1.03 g-mol p-dichlorobenzene (DCB) and 1.0 g-mol NMP were charged to the reactor. The molar ratio of sulfur compound to NMP was 0.349. This number reflects that some NMP was lost during the dehydration, 0.137 mole. Thus, of the 2 moles NMP charged before the dehydration, 1.863 remained after the dehydration. One mole of NMP was charged with the DCB to the reactor, giving a total amount of NMP of 2.863 moles. Using this amount, the sulfur to NMP molar ratio was calculated to be 1.00/2.863 or 0.349. Polymerization was carried out by heating the mixture to 235° C. and holding for one hour, followed by heating to 265° C. and holding for one hour, and then heating to 280° C. and holding for one hour. The reactor was cooled and the contents removed. After the polymerization product had been washed with isopropanol, the solid was washed with hot, distilled water until the filtrate was clear. The dried (110° C. in a vacuum oven) polymer was isolated in a yield of 95 mole % and had an extrusion rate of 45 g/10 min.

Runs 2 through 5 were carried out in a similar manner, but the amount of NMP in the dehydration mixture was decreased and the amount of NMP added to the polymerization step was increased to provide essentially the same ratio of sulfur compound to NMP as in Run 1.

Run 2 was done with 0.60 g-mol NMP added before dehydration. The dehydration step took 33 minutes from the first drops of distillate to the maximum temperature of 206° C. After the dehydration step, 1.17 g-mol water had not been removed from the dehydrated mixture. To the dehydrated mixture was added 2.40 g-mol NMP for a sulfur compound to NMP ratio of 0.335. The polymer from Run 2 was isolated in a yield of 95 mole % and had an extrusion rate of 50 g/10 min.

Polymerization runs 3 through 5 also had reduced levels of NMP added before the dehydration steps and additional NMP added for the polymerization step. The amounts of NMP added in each step and the product extrusion rates for the runs in this example are summarized in Table I. These results show that PPS polymerizations with reduced NMP levels in the dehydration step and moderate dehydration conditions, that is, a temperature in the vicinity of the atmospheric boiling point of the NMP, produce PPS with little molecular weight change as the dehydration NMP level is reduced.

TABLE I

| | Dehydration Step | | | | Polymerization | | |
|---|---|---|---|---|---|---|---|
| Run | NMP, g-mol | Temp., °C. | Time, min. | $H_2O^a$ g-mol | NMP, g-mol | S/NMP,[b] Mole Ratio | ER, g/10 min |
| 1 | 2.00 | 202 | 31 | 1.39 | 1.00 | 0.349 | 45 |
| 2 | 0.60 | 206 | 33 | 1.17 | 2.40 | 0.335 | 50 |
| 3 | 0.60 | 206 | 42 | 1.15 | 2.42 | 0.332 | 52 |
| 4 | 0.40 | 206 | 38 | 1.02 | 2.604 | 0.334 | 89 |
| 5 | 0.20 | 206 | 45 | 0.82 | 2.802 | 0.334 | 39 |

[a]Water not removed from dehydrated mixture.
[b]Adjusted for the amount of NMP lost during dehydration.

EXAMPLE II

This example presents PPS polymerization runs made with reduced levels of NMP in the dehydration step and more efficient dehydration conditions, (higher temperatures and longer times than in Example I),. All runs were made with the same sulfur compound to NMP ratio in the polymerization step.

Run 6 was carried out in a manner similar to that described in Run 1, except for the following changes. The amount of NMP added for the dehydration step was 0.60 g-mol and dehydration was carried out for 75 minutes from the time the first drop of condensed liquid was received until a maximum temperature of 226° C. was attained. After the dehydration step, 0.64 g-mol of water had not been removed from the dehydrated mixture.

To the dehydrated mixture was added 2.399 g-mol NMP with the DCB for a sulfur compound to NMP mole ratio of 0.334 (corrected for the loss of NMP during dehydration). This is essentially the same ratio as in the runs in the first example and the rest of the runs in this example. The PPS product from Run 6 had an extrusion rate of 86 g/10 min.

Runs 7, 8, and 9 were similar to Run 6 with decreasing levels of NMP in the dehydration step, more efficient dehydration conditions and added NMP in the polymerization step to maintain a constant sulfur compound to NMP mole ratio in the polymerization. The polymerization results are shown in Table II. The more efficient dehydration conditions gave lower levels of water not removed by dehydration and kept the polymer extrusion rates from increasing excessively until the lowest NMP level (0%) in Run 9.

EXAMPLE III

This example presents comparative runs that demonstrate the effect of increased concentration (lower NMP levels) during polymerizations without reduced NMP in the dehydration step and without employing a venting step to remove excess by-product water.

These runs were carried out essentially as described in Run 1 of Example I except for decreasing levels of NMP present in the polymerization step. In Run 10, 2.0 g-mol NMP were added for the dehydration step and 0.703 g-mol of NMP for the polymerization step. The sulfur compound to NMP mole ratio in the polymerization was 0.377, (corrected for the NMP loss during dehydration), and the PPS polymer had an extrusion rate of 34 g/10 min.

Runs 11, 12, and 13 were similar to Run 10, but with decreasing levels of NMP added in the polymerization step and decreasing sulfur compound to NMP mole ratios. As shown in Table III, the product extrusion rates increased significantly indicating that the polymer molecular weight decreased. This shows that without a modified dehydration with reduced NMP levels and efficient dehydration, the molecular weight of the PPS cannot be maintained with higher concentration polymerizations.

TABLE III

| | Dehydration Step | | | | Polymerization | | |
|---|---|---|---|---|---|---|---|
| Run | NMP, g-mol | Temp., °C. | Time, min. | $H_2O,^a$ g-mol | NMP, g-mol | S/NMP,[b] Mole Ratio | ER, g/10 min |
| 10 | 2.00 | 209 | 71 | 0.993 | 0.703 | 0.377 | 54 |
| 11 | 2.00 | 209 | 72 | 1.223 | 0.501 | 0.414 | 123 |
| 12 | 2.00 | 209 | 71 | 1.208 | 0.352 | 0.439 | 170 |
| 13 | 2.00 | 209 | 67 | 1.196 | 0.222 | 0.459 | 246 |

[a]Water not removed from dehydrated mixture.
[b]Adjusted for the amount of NMP lost during dehydration.

EXAMPLE IV

This example presents invention runs demonstrating the process of the present invention with reduced NMP levels in both the dehydration and polymerization steps and more efficient dehydrations.

Run 14 was carried out in a manner similar that described in Run 1 of Example I, except for the levels of

TABLE II

| | Dehydration Step | | | | Polymerization | | |
|---|---|---|---|---|---|---|---|
| Run | NMP, g-mol | Temp., °C. | Time, min. | $H_2O,^a$ g-mol | NMP, g-mol | S/NMP,[b] Mole Ratio | ER, g/10 min |
| 6 | 0.60 | 226 | 75 | 0.64 | 2.399 | 0.334 | 86 |
| 7 | 0.30 | 235 | 103 | 0.457 | 2.702 | 0.335 | 40 |
| 8 | 0.15 | 237 | 120 | 0.425 | 2.851 | 0.334 | 63 |
| 9 | 0.00 | 240 | 90 | 0.234 | 3.001 | 0.333 | c |

[a]Water not removed from dehydrated mixture.
[b]Adjusted for the amount of NMP lost during the dehydration.
[c]Very high value.

NMP in the dehydration and polymerization steps and for the dehydration conditions. Before dehydration, 0.30 g-mol NMP was charged to the reactor and dehydration was carried out for 57 minutes to the maximum temperature of 237° C. The dehydrated mixture had 0.427 g-mol of water that was not removed during the dehydration. To the dehydrated mixture was added 2.404 g-mol NMP for a sulfur to NMP ratio of 0.371 (corrected for NMP loss during dehydration). The PPS product had an extrusion rate of 40 g/10 min.

Runs 15 through 19 were carried out as described for Run 14 with the same NMP amount charged for dehydration and the more efficient dehydration conditions. However, the amount of NMP charged to the dehydrated mixture was decreased to achieve increasing ratios of sulfur to NMP or, in other words, increasing the concentration of the polymerization reaction mixture. As shown in Table IV, the PPS polymerizations at higher concentrations gave polymers with extrusion rates similar to those of control Run 1. The rapid increases in extrusion rates seen in comparative runs in Example III with higher polymerization concentrations are not seen in these invention runs.

TABLE IV

| | Dehydration Step | | | | Polymerization | | ER, g/10 min |
|---|---|---|---|---|---|---|---|
| Run | NMP, g-mol | Temp., °C. | Time, min. | $H_2O,^a$ g-mol | NMP, g-mol | $S/NMP,^b$ Mole Ratio | |
| 14 | 0.30 | 237 | 57 | 0.427 | 2.404 | 0.371 | 35 |
| 15 | 0.30 | 237 | 60 | 0.432 | 2.197 | 0.402 | 41 |
| 16 | 0.30 | 237 | 61 | 0.391 | 1.951 | 0.446 | 61 |
| 17 | 0.30 | 237 | 70 | 0.334 | 1.924 | 0.455 | 59 |
| 18 | 0.30 | 237 | 69 | 0.384 | 1.806 | 0.477 | 78 |
| 19 | 0.30 | 235 | 58 | 0.373 | 1.605 | 0.528 | 70 |

$^a$Water not removed from dehydrated mixture.
$^b$Adjusted for the amount of NMP lost during dehydration.

EXAMPLE V

Several additional PPS polymerization runs were carried out to demonstrate the effects of higher polymerization concentrations. Run 20 was carried out as described for Run 14, except for the following changes. Dehydration was carried out for 90 minutes from the first drops of condensate to the maximum temperature of 238° C. After the dehydration, 0.381 g-mol water had not been removed. To the dehydrated mixture was added 1.700 g-mol NMP for a sulfur to NMP ratio of 0.503. The product of the polymerization had an extrusion rate of 79 g/10 min.

Runs 21 through 23 were carried out in a manner similar to that in Run 20 with amounts of NMP added to the polymerization to give sulfur compound to NMP mole ratios as high as 0.605. As shown in Table V, Runs 20 and 21 had extrusion rate similar to the runs in Example IV. It is unknown why Runs 22 and 23 produced polymers with very high extrusion rates.

TABLE V

| | Dehydration Step | | | | Polymerization | | ER, g/10 min |
|---|---|---|---|---|---|---|---|
| Run | NMP, g-mol | Temp., °C. | Time, min. | $H_2O$ left,$^a$ g-mol | NMP, g-mol | $S/NMP,^b$ Mole Ratio | |
| 20 | 0.30 | 238 | 90 | 0.381 | 1.700 | 0.503 | 79 |
| 21 | 0.30 | 235 | 93 | 0.387 | 1.518 | 0.554 | 65 |
| 22 | 0.30 | 248 | 81 | 0.411 | 1.367 | 0.602 | c |
| 23 | 0.30 | 237 | 137 | 0.387 | 1.367 | 0.605 | c |

$^a$Water not removed from dehydrated mixture.
$^b$Adjusted for the amount of NMP lost during dehydration.
$^c$Very high values.

While this invention has been described in detail for the purpose of understanding the invention, it is not to be construed as limited thereby but is intended to cover all changes and modifications within the spirit and scope thereof.

That which is claimed is:

1. A process for preparing a phenylene sulfide polymer comprising the sequential steps of:
   (a) dehydrating an aqueous admixture comprising at least one sulfur source and at least one polar organic compound to remove excess water, thereby forming a dehydrated admixture, wherein the molar ratio of said polar organic compound to said sulfur source is in the range of 0.15/1 to about 0.9/1;
   (b) admixing at least one polyhalo-substituted phenylene compound with the dehydrated admixture from step (a), optionally in the presence of additional polar organic compound, to produce a polymerization mixture; and
   (c) subjecting said polymerization mixture to conditions effective to produce a polymerization reaction.

2. A process according to claim 1 wherein said sulfur source in step (a) is selected from the group consisting of alkali metal sulfide, alkali metal hydrosulfides, N-methyl-pyrrolidinethione, hydrogen sulfide, and mixtures thereof; said polar organic compound in step (a) is selected from the group consisting of organic amides, lactams, sulfones, and mixtures thereof; said polyhalo-substituted phenylene compound is selected from the group consisting of p-dihalobenzenes having the formula

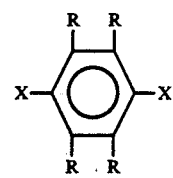

m-dihalobenzenes having the formula

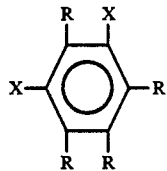

and o-dihalobenzenes having the formula

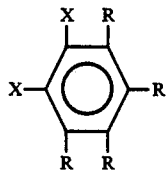

and mixtures thereof, wherein X is a halogen selected from the group consisting of chlorine, bromine, and iodine, and R is hydrogen or an alkyl radical of 1-4 carbon atoms.

3. A process according to claim 2 wherein said sulfur source in step (a) is selected from the group consisting of sodium sulfide, sodium hydrosulfide, and mixtures thereof; said polar organic compound in step (a) is N-methyl-2-pyrrolidone; and said polyhalo-substituted phenylene compound in step (b) comprises p-dichlorobenzene.

4. A process according to claim 1 wherein said polyhalo-substituted aromatic compound is present within a range from about 0.90 to about 1.10 moles of polyhalo-substituted phenylene compound per mole of sulfur source.

5. A process according to claim 4 wherein the molar ratio of polar organic compound to sulfur source in step(a) is in the range of about 0.2/1 to 0.6/1.

6. A process according to claim 1 wherein said polymerization mixture further comprises a polyhalo-substituted phenylene compound having more than two halo constituents present in an amount within the range of from about 0.01 to about 1 mole percent based on the total moles of said polyhalo-substituted phenylene compounds.

7. A process according to claim 6 wherein said polyhalo-substituted phenylene compound having more than two halo constituents present in an amount within the range of from about 0.05 to about 0.8 mole percent based on the total moles of said polyhalo-substituted phenylene compounds.

8. A process according to claim 7 wherein said polyhalo-substituted phenylene compound having more than two halo constituents present in an amount within the range of from about 0.1 to about 0.3 mole percent based on the total moles of said polyhalo-substituted phenylene compounds.

9. A process according to claim 3 wherein said sulfur source in step (a) is a mixture of sodium hydroxide and sodium hydrosulfide; said polar organic compound in step (a) is N-methyl-2-pyrrolidone and the molar ratio of polar organic compound to sulfur in step (a) is in the range of 0.2/1 to 0.6/1; and said polyhalo-substituted phenylene compound in step (b) comprises p-dichlorobenzene and is present with a range from about 0.98 to 1.04 moles of polyhalo-substituted phenylene compound per mole of sulfur source.

* * * * *